US012574978B2

(12) United States Patent
Jiang et al.

(10) Patent No.: US 12,574,978 B2
(45) Date of Patent: Mar. 10, 2026

(54) METHODS FOR CONNECTION ORIENTED DATA TRANSFER FOR ULTRA-WIDEBAND SYSTEMS AND APPARATUSES

(71) Applicant: APPLE INC., Cupertino, CA (US)

(72) Inventors: Jinjing Jiang, Campbell, CA (US); Su Khiong Yong, Palo Alto, CA (US); Robert Golshan, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 360 days.

(21) Appl. No.: 18/301,909

(22) Filed: Apr. 17, 2023

(65) Prior Publication Data

US 2023/0337295 A1     Oct. 19, 2023

Related U.S. Application Data

(60) Provisional application No. 63/363,130, filed on Apr. 18, 2022.

(51) Int. Cl.
*H04W 76/10*     (2018.01)
*H04B 1/7163*     (2011.01)
*H04L 1/1607*     (2023.01)

(52) U.S. Cl.
CPC .......... *H04W 76/10* (2018.02); *H04B 1/7163* (2013.01); *H04L 1/1607* (2013.01)

(58) Field of Classification Search
CPC ..... H04W 76/10; H04B 1/7163; H04L 1/1607
USPC ........................................................ 370/328
See application file for complete search history.

(56) References Cited

U.S. PATENT DOCUMENTS

| | | | |
|---|---|---|---|
| 2005/0152358 A1* | 7/2005 | Giesberts .............. | H04L 69/323 370/389 |
| 2012/0117446 A1* | 5/2012 | Taghavi Nasrabadi ..................... | H04L 1/0041 714/776 |
| 2025/0106884 A1* | 3/2025 | Perraud ................. | H04L 47/805 |
| 2025/0106908 A1* | 3/2025 | Perraud ................... | H04W 4/80 |

FOREIGN PATENT DOCUMENTS

| | | | | |
|---|---|---|---|---|
| WO | WO-2023101712 A1 * | 6/2023 | .............. | H04W 4/80 |
| WO | WO-2024158479 A1 * | 8/2024 | .............. | H04L 47/30 |

* cited by examiner

*Primary Examiner* — Nicholas R Taylor
*Assistant Examiner* — Chong G Kim
(74) *Attorney, Agent, or Firm* — Dorsey & Whitney LLP

(57)     ABSTRACT

A wireless device may use UWB communications in connection-oriented mode to transmit data. In some embodiments, data subframes may be introduced into a MAC frame. In some embodiments, the data subframes contain a LL packet wrapped with its own delimiter, Data Message Payload information element, and frame check sequence. In some embodiments, the data subframes may also include a duplicated MAC header.

20 Claims, 9 Drawing Sheets

| MHR 602 | PAYLOAD IE 604 | FCS 606 | data subframe 1 618 | ... | data subframe n 620 |
|---|---|---|---|---|---|

| DELIMITER 608 | MHR 610 | DATA MESSAGE PAYLOAD IE HEADER 612 | LL PACKET 1 614 | FCS 616 |
|---|---|---|---|---|

600

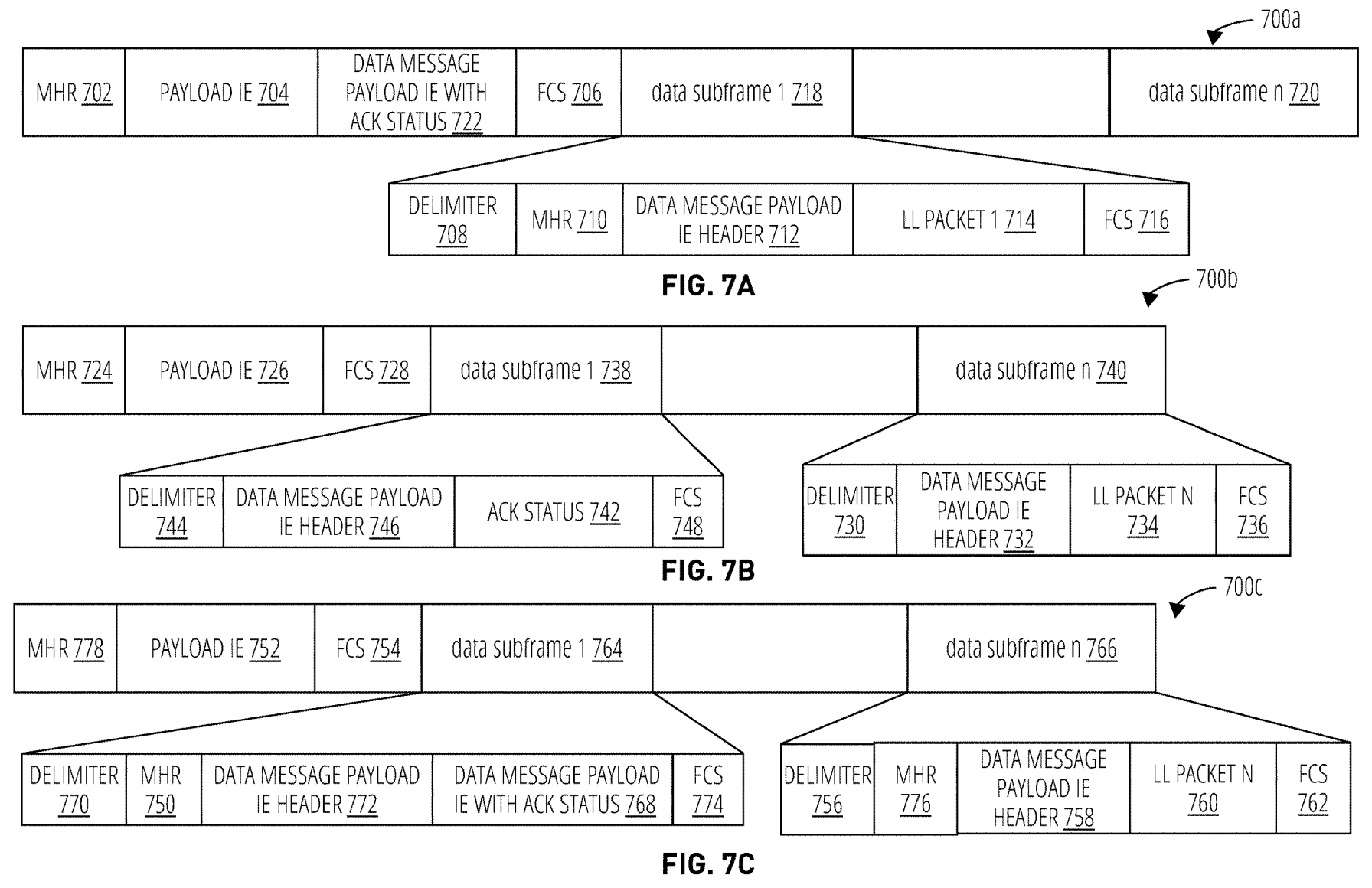

700a

| MHR 702 | PAYLOAD IE 704 | DATA MESSAGE PAYLOAD IE WITH ACK STATUS 722 | FCS 706 | data subframe 1 718 | data subframe n 720 |

| DELIMITER 708 | MHR 710 | DATA MESSAGE PAYLOAD IE HEADER 712 | LL PACKET 1 714 | FCS 716 |

| MHR 724 | PAYLOAD IE 726 | FCS 728 | data subframe 1 738 | data subframe n 740 |

| DELIMITER 744 | DATA MESSAGE PAYLOAD IE HEADER 746 | ACK STATUS 742 | FCS 748 |

| DELIMITER 730 | DATA MESSAGE PAYLOAD IE HEADER 732 | LL PACKET N 734 | FCS 736 |

| MHR 778 | PAYLOAD IE 752 | FCS 754 | data subframe 1 764 | data subframe n 766 |

| DELIMITER 770 | MHR 750 | DATA MESSAGE PAYLOAD IE HEADER 772 | DATA MESSAGE PAYLOAD IE WITH ACK STATUS 768 | FCS 774 |

| DELIMITER 756 | MHR 776 | DATA MESSAGE PAYLOAD IE HEADER 758 | LL PACKET N 760 | FCS 762 |

FIG. 7C

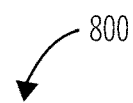
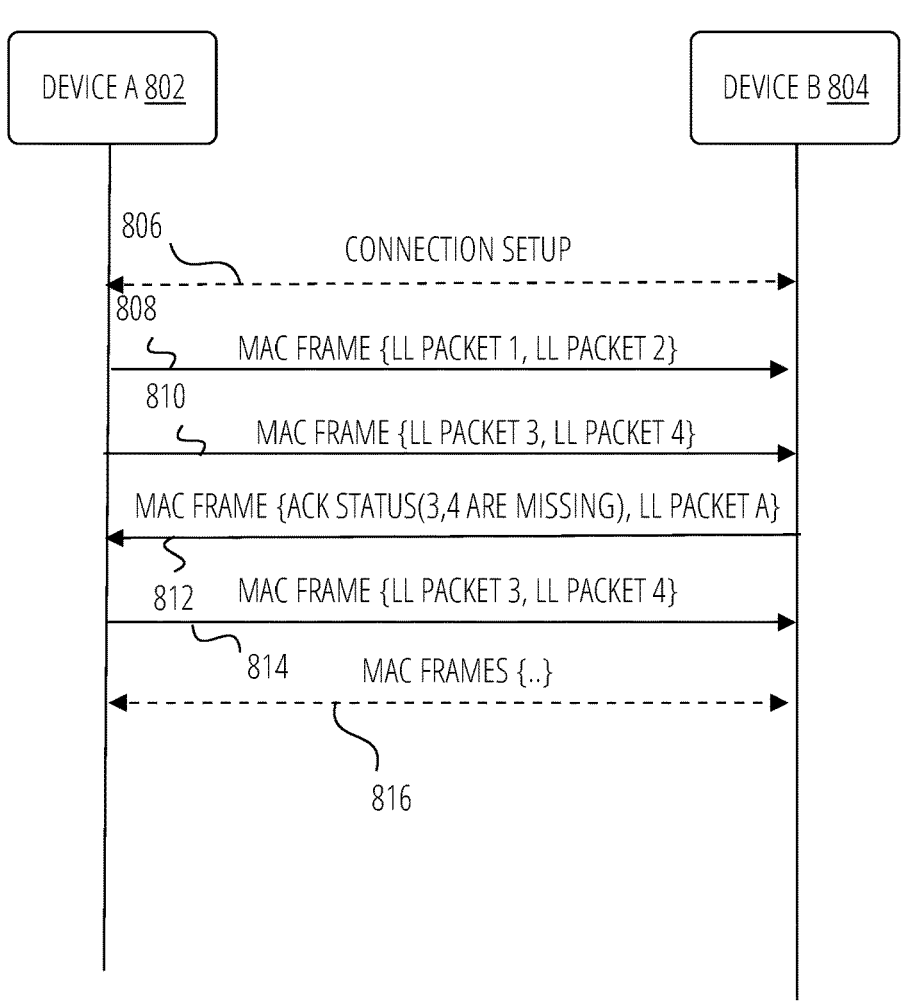
FIG. 8

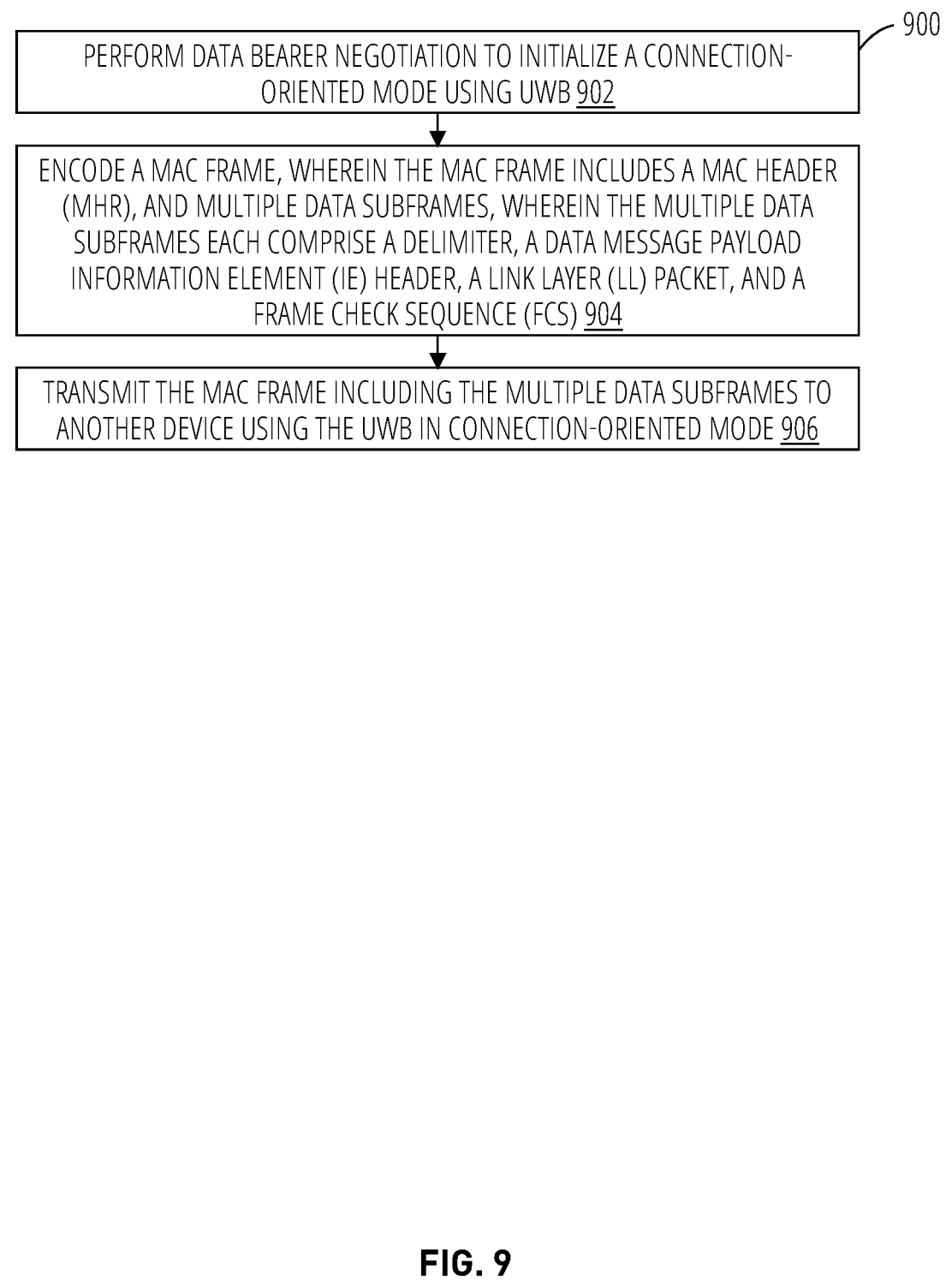

900

PERFORM DATA BEARER NEGOTIATION TO INITIALIZE A CONNECTION-ORIENTED MODE USING UWB 902

ENCODE A MAC FRAME, WHEREIN THE MAC FRAME INCLUDES A MAC HEADER (MHR), AND MULTIPLE DATA SUBFRAMES, WHEREIN THE MULTIPLE DATA SUBFRAMES EACH COMPRISE A DELIMITER, A DATA MESSAGE PAYLOAD INFORMATION ELEMENT (IE) HEADER, A LINK LAYER (LL) PACKET, AND A FRAME CHECK SEQUENCE (FCS) 904

TRANSMIT THE MAC FRAME INCLUDING THE MULTIPLE DATA SUBFRAMES TO ANOTHER DEVICE USING THE UWB IN CONNECTION-ORIENTED MODE 906

FIG. 9

METHODS FOR CONNECTION ORIENTED DATA TRANSFER FOR ULTRA-WIDEBAND SYSTEMS AND APPARATUSES

TECHNICAL FIELD

This application relates generally to wireless communication systems, including ultra-wideband communications when data transfer is executed in connection-oriented mode.

BACKGROUND

Wireless communication technology uses various standards and protocols to transmit data between wireless communication devices. Wireless communication system standards and protocols can include, for example, fine ranging (FiRa), IEEE 802.15.4 standard for Low-Rate Wireless Networks, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the FiRa, wireless signals can be used to determine distance between electronic devices. Networks used by FiRa are typically referred to as Ultra-Wideband (UWB) networks. UWB networks may connect wireless electronic devices in various arrangements. In one example, a UWB network may comprise a primary device (e.g., a controller or initiator) and one or more secondary devices (e.g., controlees or responders). The devices of the UWB network may perform various functionalities with respect to the other devices connected to the UWB network.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 7A illustrates a MAC frame with an acknowledgement status field in accordance with a first embodiment.

FIG. 7B illustrates a MAC frame with an acknowledgement status field in accordance with a second embodiment.

FIG. 7C illustrates a MAC frame with an acknowledgement status field in accordance with a third embodiment.

FIG. 8 is a signal flow diagram of devices using the connection-oriented mode MAC frame structure of FIG. 4 in accordance with one embodiment.

FIG. 9 illustrates a flow chart of a method for a wireless device to transmit a MAC frame in connection-oriented mode using an UWB connection in accordance with one embodiment.

DETAILED DESCRIPTION

Various data transfer modes may be used for ultra-wideband (UWB) communications such as those modes used for FiRa. The data transfer modes for FiRa include bypass mode, connectionless mode, and connection-oriented mode. Connection-oriented mode may be used to send data between devices over an UWB transmission. Currently, the multiplexing of multiple link layer (LL) packets in connection-oriented mode may make the application data long and potentially increase the possibility of the payload being garbled due to limited link budget or interference.

Embodiments herein improve the robustness of Medium Access Control (MAC) frames to reduce the possibility of all LL packets in a MAC frame being lost. In some embodiments, data subframes are introduced into a MAC frame. In some embodiments, the data subframes contain a LL packet wrapped with its own delimiter, Data Message Payload information element, and frame check sequence. In some embodiments, the data subframes may also include a duplicated MAC header.

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

Figure 1:
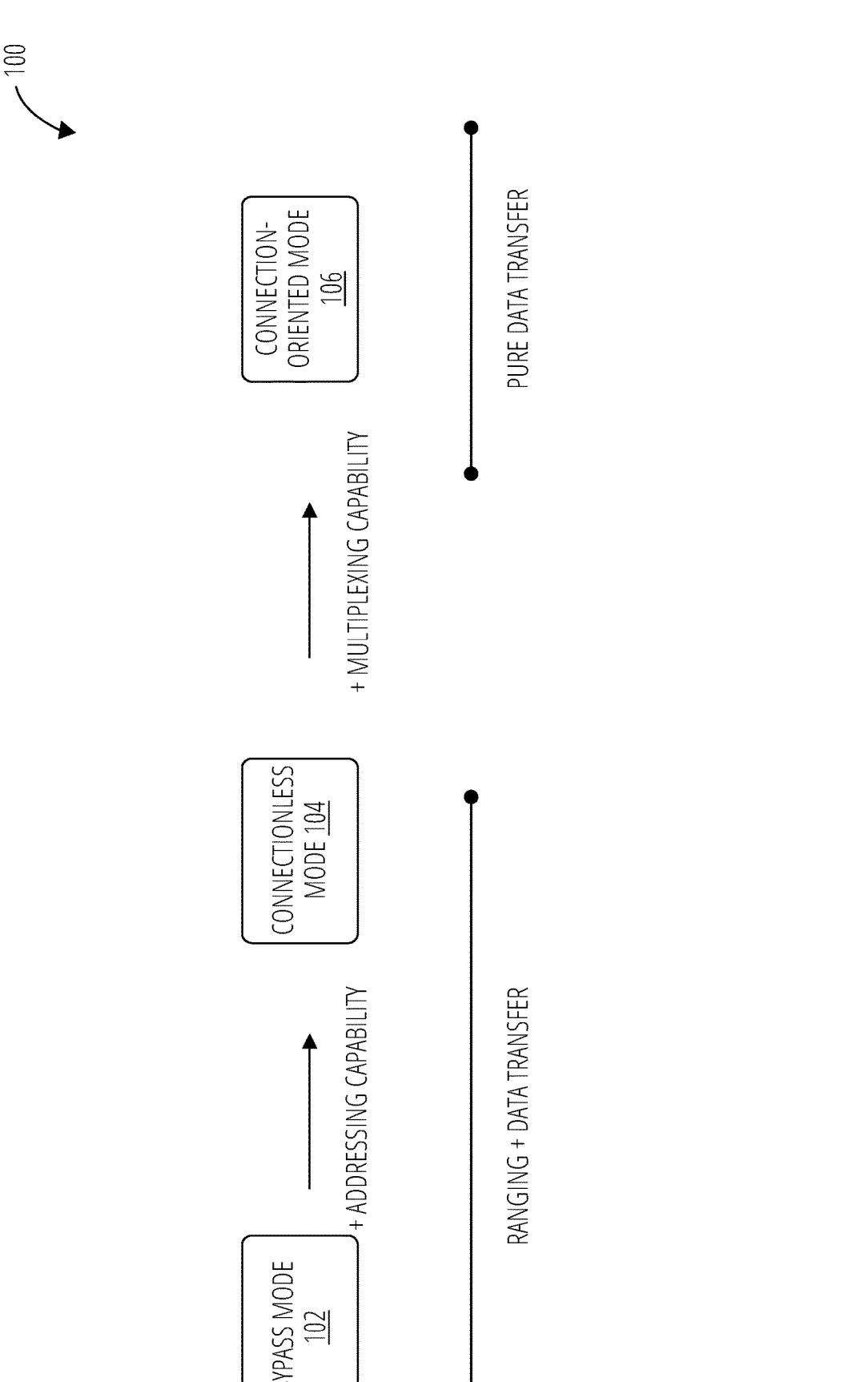
FIG. 1 is a representation of the relationship between three different data transfer modes that may be used with ultra-wideband (UWB) networks such as those used for FiRa

FIG. 1 is a representation of the relationship between three different data transfer modes 100 that may be used with UWB communications such as those used for FiRa. The data transfer modes 100 include a bypass mode 102, connectionless mode 104, and connection-oriented mode 106.

The bypass mode 102 and the connectionless mode 104 may be used for simultaneous ranging and data transfer between two devices. Ranging includes determining the distance between two devices. A device using bypass mode 102 will place application data generated by an application directly into a MAC frame. In bypass mode 102 the application data bypasses other layers between the MAC layer and the application layer. In connectionless mode 104 application data can be consumed by specific entities called end points. To allow for application data to be routed to specific end points, connectionless mode 104 adds addressing capability. In connectionless mode 104 a header may be placed in front of the application data to indicate the end point to which the application data should be routed.

In addition to ranging, there are other use cases for UWB network devices. For example, UWB network devices can be used for pure data transfer. Pure data transfer allows for data to be transferred between devices without ranging functionality. Connection-oriented mode 106 may be used for this pure data transfer and may include multiplexing capability. In connection-oriented mode 106, the application layer may generate significant amount of data to send to another end point. The connection-oriented mode 106 may facilitate data transfer and control of quality of service (Qos) and other communication settings. Embodiments herein provide improvements to methods, devices, and systems using connection-oriented mode 106.

Figure 2:
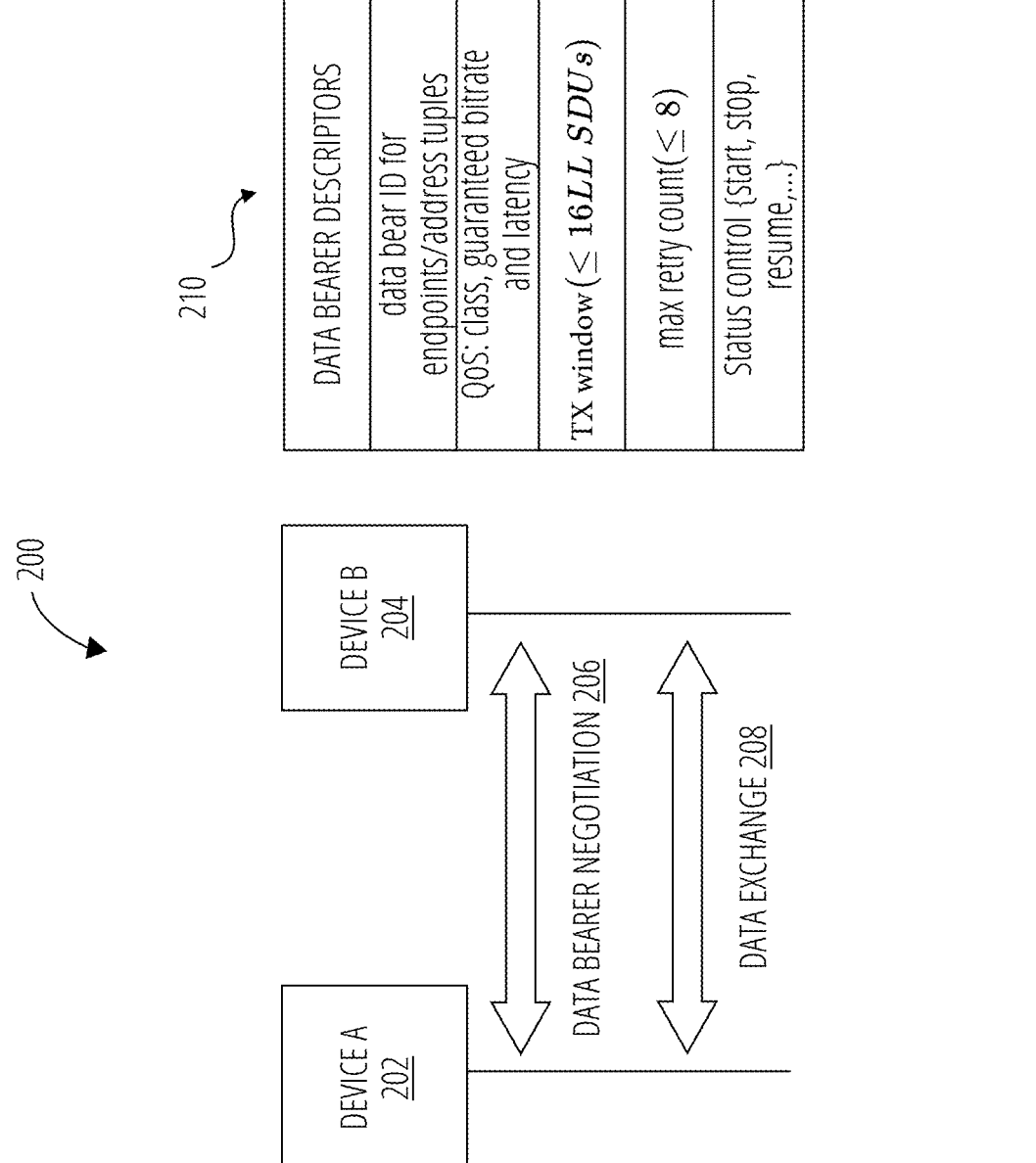
FIG. 2 is a signal flow diagram for the pure data transfer between two devices using connection-oriented mode in accordance with one embodiment.

FIG. 2 is a signal flow diagram 200 for the pure data transfer between two devices using connection-oriented mode in accordance with one embodiment. To initiate the connection between the two devices (i.e., device A 202 and device B 204), the devices perform a data bearer negotiation 206.

During the data bearer negotiation 206 various data bearer descriptors 210 are initialized. The data bearer negotiation 206 assigns data bearer identifier (ID) and address tuples for a source and destination endpoints. The data bearer negotiation 206 also is used to define QoS, data rate, guaranteed bitrate, and latency. The data bearer negotiation 206 may also define a largest burst for a transmit (TX) window, the max number of retries if a packet is lost, and status controls.

After the data bearer negotiation 206 is performed a data exchange 208 may occur. Embodiments herein provide improvements to the data exchange 208 process using UWB networks such as those used for FiRa.

Figures 3, 4:
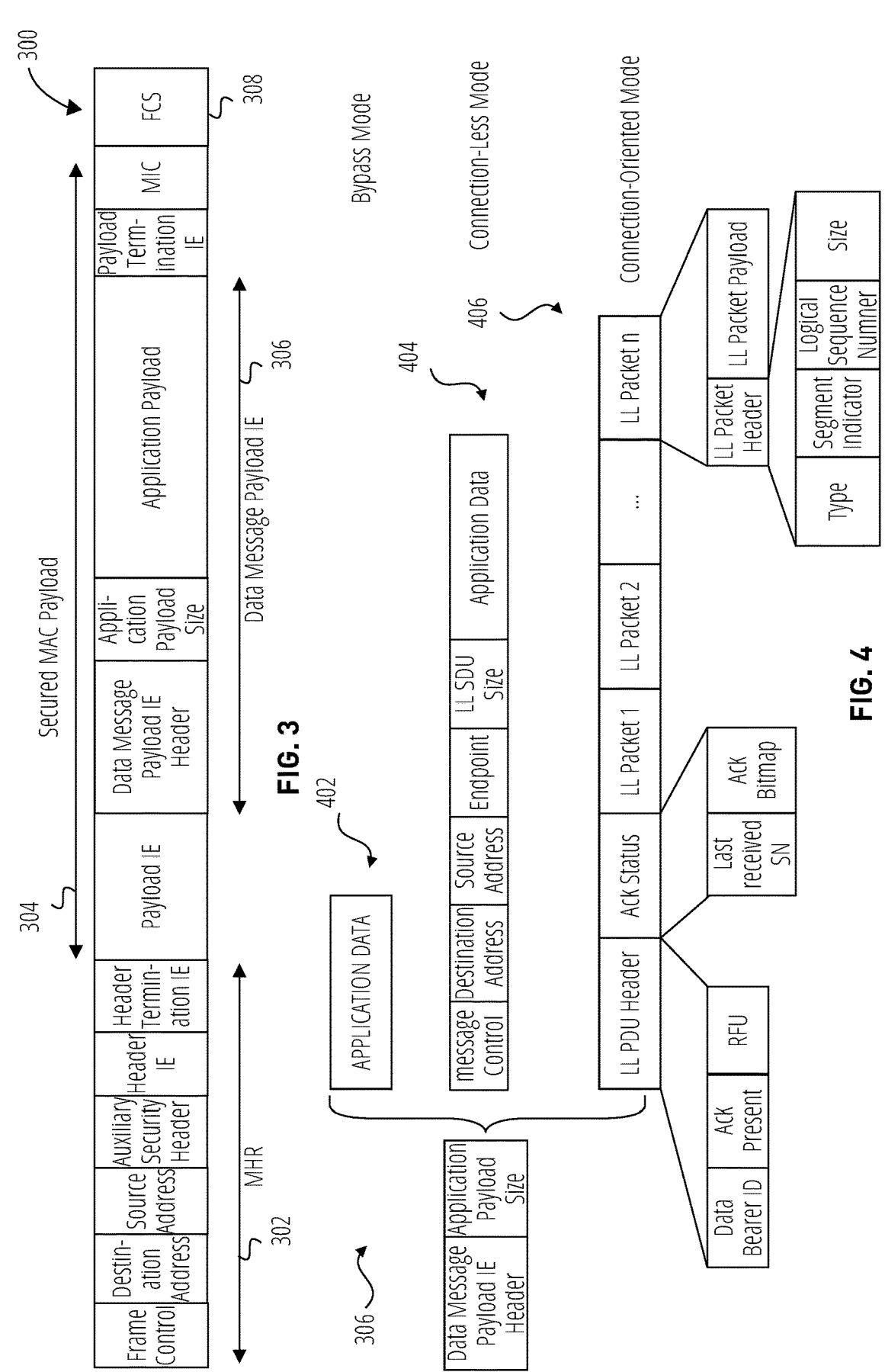
FIG. 3 is a frame structure of a Medium Access Control (MAC) transmission in accordance with one embodiment.
FIG. 4 illustrates three different frame structures that may be used for the Data Message Payload IE of the MAC message based on different data transfer modes.

FIG. 3 is a frame structure 300 of a MAC transmission in accordance with one embodiment. The MAC transmission includes a MAC header (MHR) 302, a secured MAC payload 304 including a Data Message Payload information element (IE) 306, and a frame check sequence (FCS) 308.

FIG. 4 illustrates three different frame structures that may be used for the Data Message Payload IE 306 of the MAC message based on connection modes. As shown, in each mode, the application payload is formatted differently. In bypass mode 402, the application payload may simply include application data. The application data may be appended directly to the Payload IE by adding the Data Message Payload IE header and corresponding application payload size. In the connection-less mode 404, the application payload comprises the application data and also includes additional addressing fields (e.g., destination address, source address, etc.). In the connection-oriented mode 406 a device can multiplex multiple LL packets together into the application payload allowing the LL packets to be transmitted together in one MAC frame.

However, there may be limitations to the data exchange using the connection-oriented mode 406 that may be improved. For example, some implementations may assume that a longer payload length is used for UWB communications, such as higher pulse repetition frequency (HPRF) mode. However, it may be desirable to also use base pulse repetition frequency (BPRF) mode. For BPRF mode, the payload length is much shorter than HPRF (e.g., typically the payload length≤127 bytes for BPRF mode). It may be very difficult to multiplex multiple LL packets using such a short payload length.

Further, the multiplexing of multiple LL packets makes the application data long and potentially increases the possibility of the payload being garbled due to limited link budget or interference. For instance, in the frame structure illustrated, the wrong decoding of one LL packet renders all packets lost. In this single MAC frame there is only one FCS to check whether the frame is received correctly or not at the MAC layer. Additionally, an Ack status field of the connection-oriented mode 406 may contain an acknowledgment bitmap indicating which LL packets were successfully received from a previous transmission. However, the acknowledgment bitmap may not be very useful because the acknowledgment status for the previous transmission would indicate only that all of them are lost or received correctly since the wrong decoding of one LL packet renders all packets lost. Further, using the illustrated approach, only the packets from the same data bearer can be aggregated.

Embodiments herein provide a way to ensure that the LL packets can be decoded independently to reduce these limitations. Some embodiments use LL packet aggregation at the MAC layer, rather than the Link layer to facilitate independent decoding.

Figure 5:
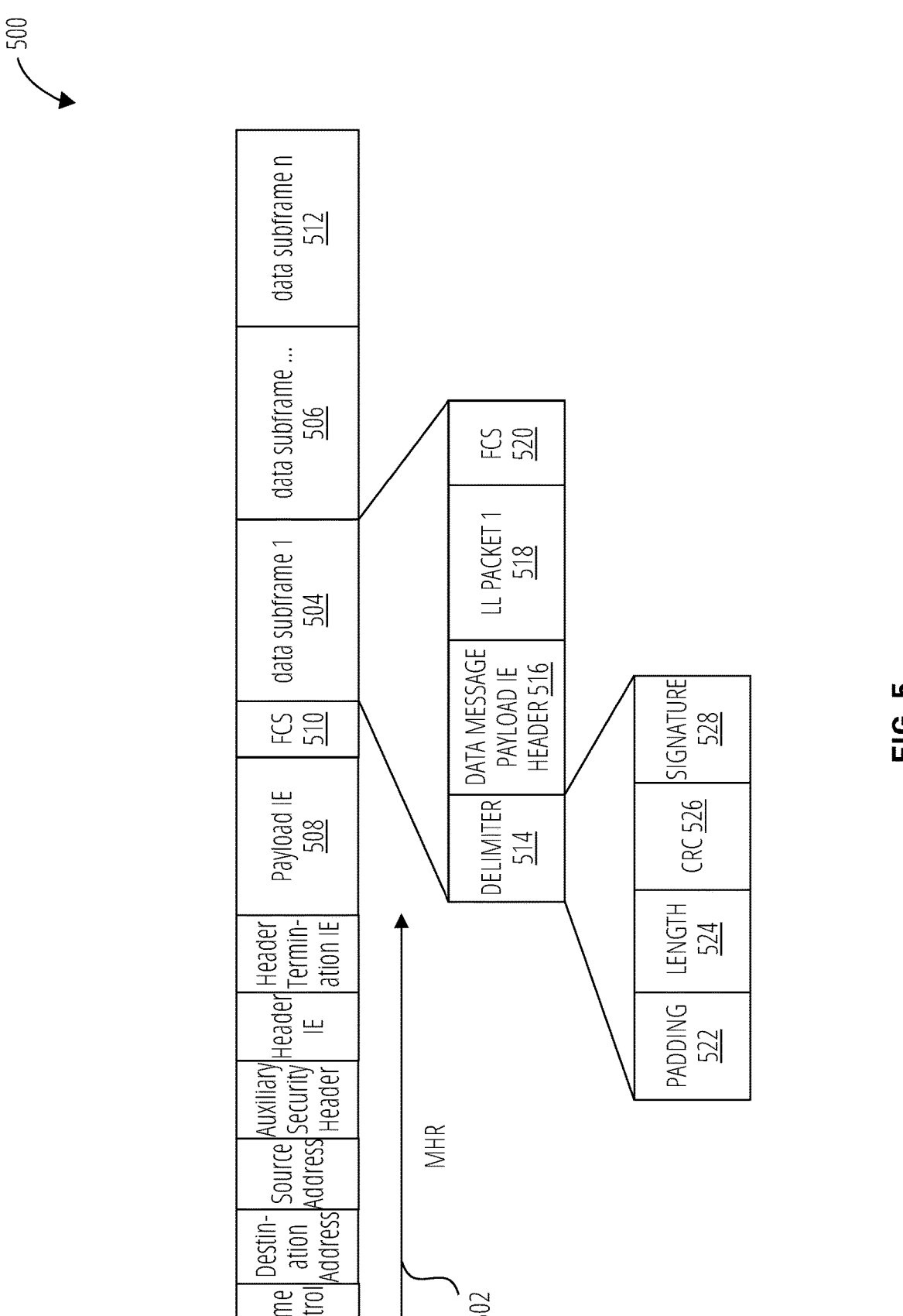
FIG. 5 is a frame structure of a MAC transmission divided into multiple data subframes comprising the LL packets in accordance with one embodiment.

FIG. 5 is a frame structure 500 of a MAC transmission divided into multiple data subframes comprising the LL packets in accordance with one embodiment. The embodiment illustrated in FIG. 5 does not include a duplicated MHR. Instead, as shown, the frame structure 300 of the MAC transmission includes a single MHR 502, a Payload IE 508 followed by an FCS 510, and multiple data subframes (i.e., data subframe 1 504, data subframe . . . 506, and data subframe n 512). The MHR 502 may include frame control, destination address source address, auxiliary security header, header IE, and header termination IE.

The data subframes may allow for the LL packets to be independently decoded. To facilitate independent decoding, each LL packet may be associated with a delimiter and an independent FCS. An independent FCS refers to an FCS for a particular subframe. Each LL packet may be wrapped around within its own Data Message Payload IE and FCS. Each wrap-around may be separated by one or multiple delimiters. The delimiters may be used for searching the beginning of a LL packet. The delimiters may include length (Data Message Payload IE+FCS) and fixed signature (used by searching algorithm). Multiple delimiters between two LL packets may be used to give more time to prepare for aggregation. The FCS may be used by the receiving device to validate that the LL packet within the data subframe was properly decoded.

For instance, each data subframe may have the same structure as is shown in relation to data subframe 1 504. Data subframe 1 504 comprises a delimiter 514, a Data Message Payload IE header 516, LL packet 1 518, and an FCS 520. The Data Message Payload IE header 516 may describe the data in the data subframe. In some embodiments, the Data Message Payload IE header 516 may reuse the current control plane design. In some embodiments, the devices may negotiate capabilities and QoS indication using out of band (OOB) and add endpoints signaling and status indication (start, stop, resume, etc.) in the Data Message Payload IE header 516 which may remove most of the in-band control plane. Additionally, if the current LL packet header design is not used, signaling of logic sequence number and segment may be placed in the Data Message Payload IE header 516.

When the transmitting device sends the MAC transmission to the receiving device, the receiving device will attempt to decode the LL packets. For instance, the receiving device can find the beginning of the data subframe 1 504 using the delimiter 514. After decoding the data subframe 1 504 the receiving device may use the FCS 520 of the data subframe 1 504 for a Cyclic Redundancy Checksum (CRC) to check if LL packet 1 518 can be decoded correctly. The LL packet 1 518 may be passed to the upper layers for further processing if the LL packet 1 518 can be decoded correctly.

The delimiter of each of the data subframes may comprise padding 522, a length indicator 524, a CRC 526, and a signature 528. The length indicator 524 indicates the length of the data subframe, the CRC 526 may be used to make sure that the length is decoded correctly. The signature 528 may be used by the receiving device to search for the beginning of the data subframe. The padding 522 may be used to pad the data subframe to a desired size. For example, each data subframe may be padded to size of multiple of k bytes (e.g., k=4).

In some embodiments, a physical header may define the total length of the MAC frame. In some embodiments, to indicate the final data subframe, the delimiter of the final data subframe may have an altered signature. The altered signature in the final data subframe may be different from all of the previous delimiter signatures. For example the altered signature may have one or more distinct characters that the search algorithm may use to find the final data subframe.

Figure 6:
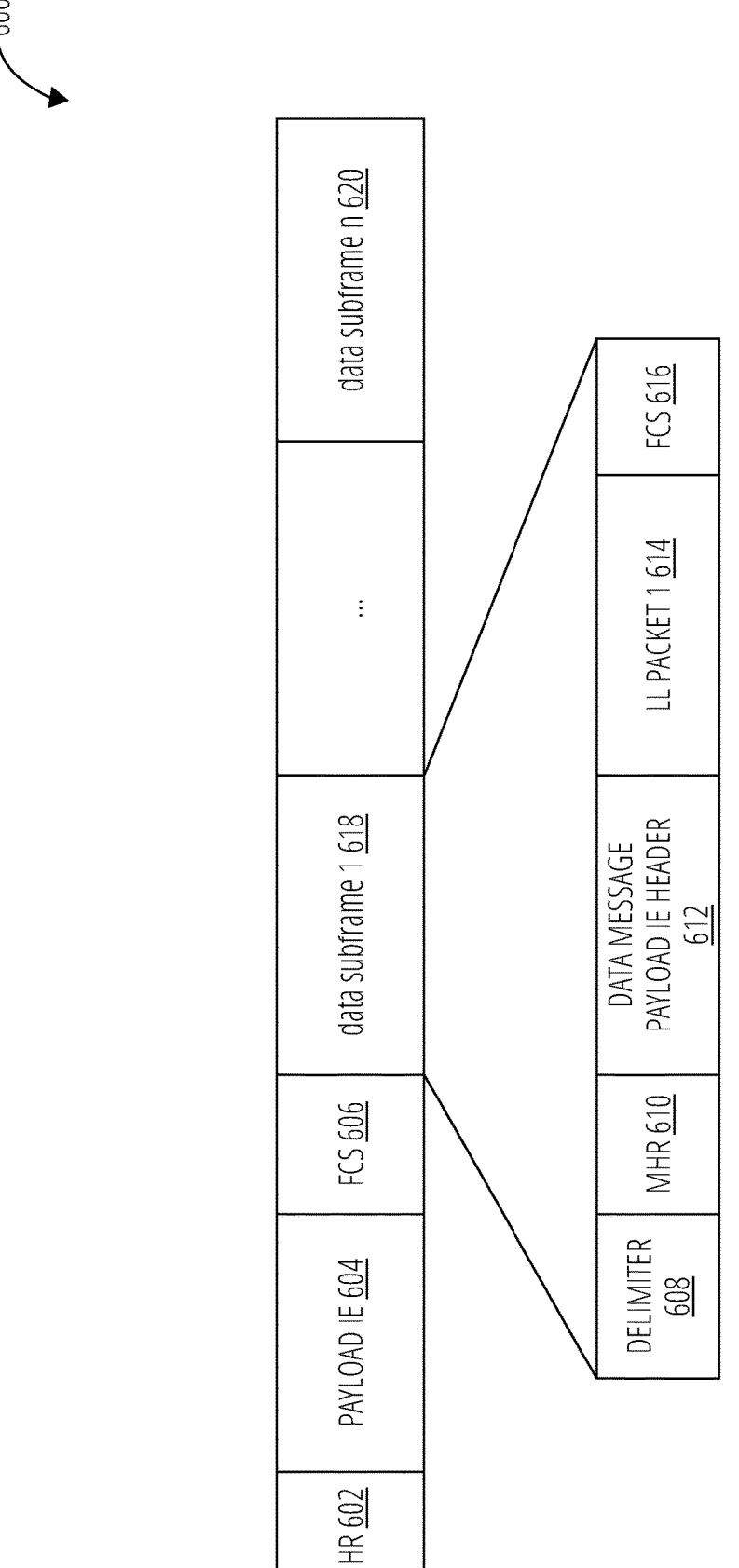
FIG. 6 is a frame structure of a MAC transmission divided into multiple data subframes comprising the LL packets in accordance with another embodiment.

FIG. 6 is a frame structure 600 of a MAC transmission divided into multiple data subframes comprising the LL packets in accordance with another embodiment. The frame structure 600 includes an MHR 602, Payload IE 604, FCS 606, and multiple data subframes. In contrast to the embodiment shown in FIG. 5, the frame structure 600 illustrated in FIG. 6 includes a duplicated MHR. That is, each of the data subframes (e.g., data subframe 1 618 and data subframe n 620) includes its own MHR (e.g., MHR 610). Hence, the "duplicated MHR" does not mean that the contents of MHR are the same for each data subframes. Each data subframe (e.g., data subframe 1 618) may include a delimiter (e.g., delimiter 608), an MHR (e.g., MHR 610), a Data Message Payload IE header (e.g., Data Message Payload IE header 612), a LL packet (e.g., LL packet 1 614, and a FCS (e.g., FCS 616).

For each LL packet, the transmitting device may form an independent MAC Protocol Data Unit (MPDU) and aggregate the independent MPDUs together into a Protocol Service Data Unit (PSDU). With the duplicated MHR, the transmission may be more robust. For example, if the MHR 502 of FIG. 5 was decoded incorrectly or was not received, the receiving device would be unable to receive any of the LL packets because the receiving device wouldn't know if the packets were addressed to the receiving device. In contrast, using the duplicated MHR for each of the LL packets as shown in FIG. 6, the corruption of a first MHR would not cause issue for other following LL packets. Additionally, because each LL packet has its own MHR, encryption per LL packet may be applied. In other words, each LL packet may be independently encrypted.

The MHR 602 and MHR 610 may include all the fields shown in relation to MHR 502 of FIG. 5 (e.g., frame control, destination address source address, auxiliary security header, header IE, and header termination IE). The delimiters may also include the fields shown in relation to delimiter 514 of FIG. 5 (e.g., padding, a length indicator, a CRC, and a signature).

FIGS. 7A-7C illustrate three ways in which an acknowledgement (Ack) status field may be incorporated in a MAC frame in accordance with some embodiments. The Ack status design may align with standards. However, the Ack status may be positioned within the MAC frame and wrapped around with Data Message Payload IE separated from other LL packets. The Ack stats may be sent by a receiving device to indicate whether LL packets were successfully received.

In the first embodiment illustrated in FIG. 7A, the MAC frame 700a comprises an MHR 702, payload IE 704, Data Message Payload IE with Ack status 722, an FCS 706, and one or more data subframes (e.g., data subframe 718 and data subframe n 720).

As shown, the Data Message Payload IE with Ack status 722 is appended to the payload IE 704. A receiving device may also include data subframes with LL packets following the Data Message Payload IE with Ack status 722 and the FCS 706 in the case of two-way communication between the receiving device and the transmitting device. Each data subframe may include a delimiter 708, an MHR 710, a Data Message Payload IE header 712, a LL packet (e.g., LL packet 1 714), and an FCS 716.

In the second embodiment illustrated in FIG. 7B, the Ack status 742 is incorporated into an independent (i.e., data subframe 738) and the MAC frame 700b includes a non-duplicated MHR 724. Besides the Ack status 742, the MAC frame 700b may be structured similar to the frame structure 500 of FIG. 5. For instance, the MAC frame 700b includes an MHR 724, a payload IE 726, an FCS 728, and multiple data subframes.

As shown, in some embodiments, the data subframe containing the Ack status 742 may be the first data subframe 738. The first data subframe 738 may include a delimiter 744, a Data Message Payload IE header 746, an Ack status 742, and an FCS 748. While in the illustrated embodiment, the Ack Status 742 is shown in the first data subframe 738, the order in which the subframes are encoded may be altered in different embodiments.

A receiving device may also include data subframes (e.g., data subframe n 740) with LL packets following the data subframe 738 containing the Data Message Payload IE with Ack status 768. The additional data subframes may include data to be sent from the receiving device to the transmitting device to facilitate two-way communication. The additional data subframes may include a delimiter 730, a Data Message Payload IE header 732, an LL packet 734, and an FCS 736.

In the third embodiment shown in FIG. 7C, the Data Message Payload IE with Ack status 768 is incorporated into an independent (i.e., data subframe 764) and the MAC frame 700c includes a duplicated MHR (e.g., MHR 778, MHR 750, and MHR 776. Besides the Data Message Payload IE with Ack status 768, the MAC frame 700c may be structured similar to the frame structure 600 of FIG. 6.

As shown, in some embodiments, the data subframe containing the Data Message Payload IE with Ack status 768 may be the first data subframe. The first data subframe 764 may include a delimiter 770, an MHR 750, a Data Message Payload IE header 772, a Data Message Payload IE with Ack status 768, and an FCS 774. While in the illustrated embodiment, the Data Message Payload IE with Ack status 768 is shown in the first data subframe 764, the order in which the subframes are encoded may be altered in different embodiments.

A receiving device may also include data subframes (e.g., data subframe n 766) with LL packets following the data subframe 764 containing the Data Message Payload IE with Ack status 768. The additional data subframes may include data to be sent from the receiving device to the transmitting device to facilitate two way communication. The additional data subframes may include a delimiter 756, an MHR 776, a Data Message Payload IE header 758, an LL packet 760, and an FCS 762.

FIG. 8 is a signal flow diagram 800 of devices using the MAC frame structure shown in the connection-oriented mode 406 of FIG. 4. The MAC frames may be used for connection-oriented data transfer for BPRF. The connection-oriented mode 406 of FIG. 4 lacked the improvements shown in FIG. 5-7C. Accordingly, a receiving device (e.g., device B 204) can only send an Ack status related to whether all of the LL packets in a MAC frame are received successfully or are not successfully received.

To provide a clearer understanding of which packets failed, in some embodiments, a device may divide the LL packets into multiple MAC frames and send them without receiving an acknowledgment in between the MAC frames. There could be multiple MAC frames sent on the fly without an acknowledgement received right away.

For example, device A 802 and device B 204 may perform a connection setup 806. After the connection is set up, device A may send a first MAC frame 808 and a second MAC frame 810 without receiving an acknowledgment from device B 204 between the MAC frames. Then device B 204 may send a response MAC frame 812 that indicates whether the LL packets of first MAC frame 808 and/or the LL packets of second MAC frame 810 failed to be received or properly decoded. The response MAC frame 812 may also include LL packets sent by device B 204. The device A 202 may retransmit a MAC frame 814 containing the missing LL packets. The devices may continue to send additional MAC frames 816.

FIG. 9 illustrates a flow chart of a method 900 for a wireless device to transmit a MAC frame in connection-oriented mode using an UWB connection. The method comprises performing 902 data bearer negotiation to initial-ize a connection-oriented mode using UWB. The method further comprises encoding 904 a MAC frame, wherein the MAC frame includes a MAC header (MHR), and multiple data subframes, wherein the multiple data subframes each comprise a delimiter, a Data Message Payload information element (IE) header, a link layer (LL) packet, and a frame check sequence (FCS). The method 900 further comprises transmitting 906 the MAC frame including the multiple data subframes to another device using the UWB in connection-oriented mode.

In some embodiments, each of the data subframes further comprises a duplicated MHR. In some embodiments, the method further comprises receiving a second MAC frame comprising an acknowledgment status indicating whether each of the LL packets were successfully received, wherein the acknowledgment status is included after a payload IE or in an independent data subframe. In some embodiments, the method further comprises encoding within the MAC frame an acknowledgment status included after a payload IE or in an independent data subframe. In some embodiments the independent data subframe comprises a duplicated MHR. In some embodiments, the delimiter of each of the data sub-frames comprises padding, a length indicator, a CRC, and a signature. In some embodiments, the signature of a final data subframe is altered to indicate the final data subframe.

Embodiments contemplated herein include an apparatus comprising means to perform one or more elements of the method 900. This apparatus may be, for example, an appa-ratus of a user equipment (UE) (such as a first wireless device 1002 that is a UE, as described herein).

Embodiments contemplated herein include one or more non-transitory computer-readable media comprising instruc-tions to cause an electronic device, upon execution of the instructions by one or more processors of the electronic device, to perform one or more elements of the method 900. This non-transitory computer-readable media may be, for example, a memory of a UE (such as a memory 1006 of a first wireless device 1002 that is a UE, as described herein).

Embodiments contemplated herein include an apparatus comprising logic, modules, or circuitry to perform one or more elements of the method 900. This apparatus may be, for example, an apparatus of a UE (such as a first wireless device 1002 that is a UE, as described herein).

Embodiments contemplated herein include an apparatus comprising: one or more processors and one or more com-puter-readable media comprising instructions that, when executed by the one or more processors, cause the one or more processors to perform one or more elements of the method 900. This apparatus may be, for example, an appa-ratus of a UE (such as a first wireless device 1002 that is a UE, as described herein).

Embodiments contemplated herein include a signal as described in or related to one or more elements of the method 900.

Embodiments contemplated herein include a computer program or computer program product comprising instruc-tions, wherein execution of the program by a processor is to cause the processor to carry out one or more elements of the method 900. The processor may be a processor of a UE (such as a processor(s) 1004 of a first wireless device 1002 that is a UE, as described herein). These instructions may be, for example, located in the processor and/or on a memory of the UE (such as a memory 1006 of a first wireless device 1002 that is a UE, as described herein).

Figure 10:
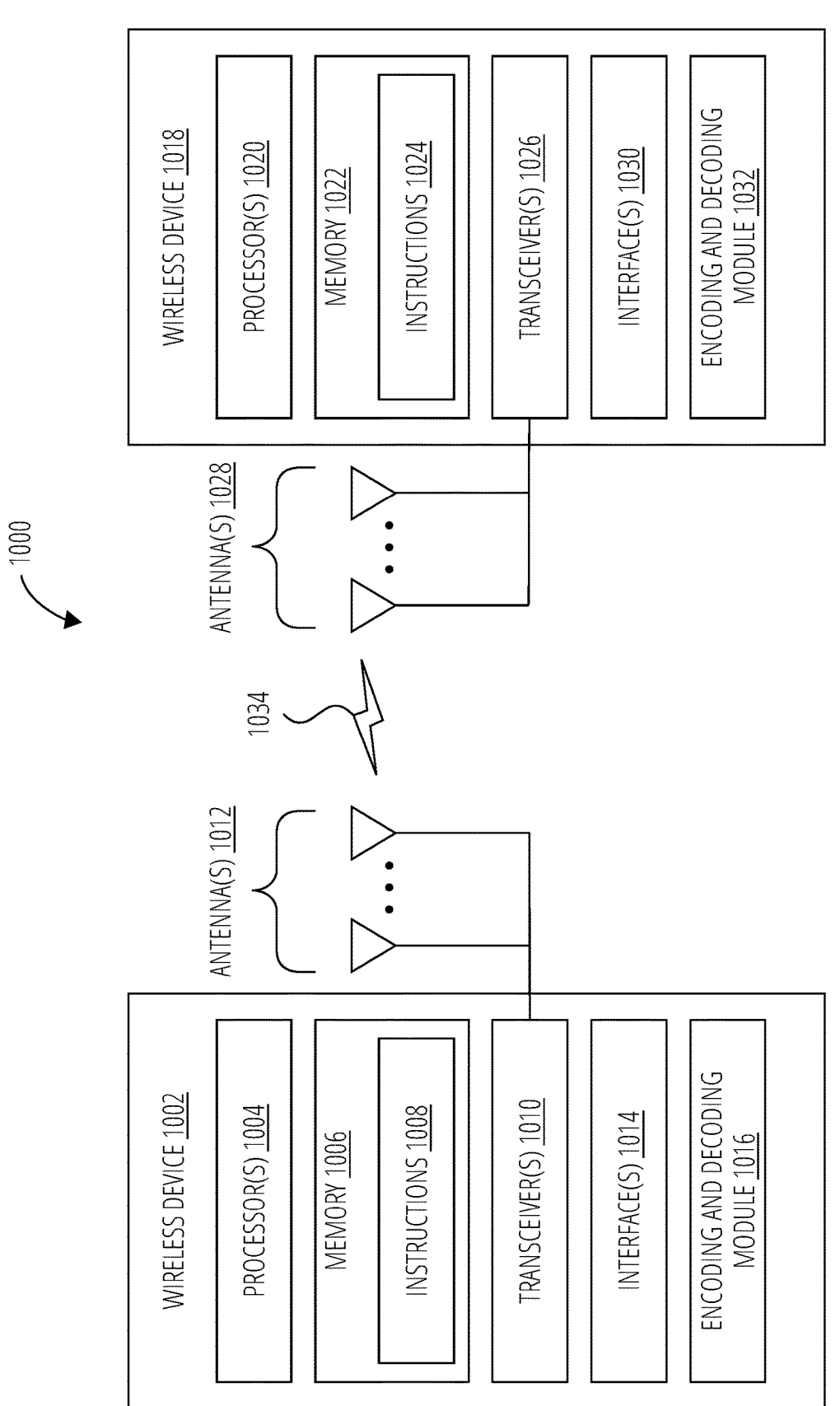
FIG. 10 illustrates a system for performing signaling between a wireless device and a network device, according to embodiments disclosed herein.

FIG. 10 illustrates a system 1000 for performing signaling 1034 between two wireless devices (i.e., first wireless device 1002 and second wireless device 1018) according to embodiments disclosed herein. The system 1000 may be a portion of a wireless communications system as herein described. The wireless devices may be, for example, a user equipment (UE) of a wireless communication system, a beacon, a primary device, a controller, an initiator, a sec-ondary device, a controlee, or a responder.

The first wireless device 1002 may include one or more processor(s) 1004. The processor(s) 1004 may execute instructions such that various operations of the first wireless device 1002 are performed, as described herein. The pro-cessor(s) 1004 may include one or more baseband proces-sors implemented using, for example, a central processing unit (CPU), a digital signal processor (DSP), an application specific integrated circuit (ASIC), a controller, a field pro-grammable gate array (FPGA) device, another hardware device, a firmware device, or any combination thereof configured to perform the operations described herein.

The first wireless device 1002 may include a memory 1006. The memory 1006 may be a non-transitory computer-readable storage medium that stores instructions 1008 (which may include, for example, the instructions being executed by the processor(s) 1004). The instructions 1008 may also be referred to as program code or a computer program. The memory 1006 may also store data used by, and results computed by, the processor(s) 1004.

The first wireless device 1002 may include one or more transceiver(s) 1010 that may include radio frequency (RF) transmitter and/or receiver circuitry that use the antenna(s) 1012 of the first wireless device 1002 to facilitate signaling (e.g., the signaling 1034) to and/or from the first wireless device 1002 with other devices (e.g., the second wireless device 1018) according to corresponding RATs.

The first wireless device 1002 may include one or more antenna(s) 1012 (e.g., one, two, four, or more). For embodi-ments with multiple antenna(s) 1012, the first wireless device 1002 may leverage the spatial diversity of such multiple antenna(s) 1012 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the first wireless device 1002 may be accomplished according to precoding (or digital beamform-ing) that is applied at the first wireless device 1002 that multiplexes the data streams across the antenna(s) 1012 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the first wireless device 1002 may implement analog beamforming techniques, whereby phases of the signals sent by the antenna(s) 1012 are relatively adjusted such that the (joint) transmission of the antenna(s) 1012 can be directed (this is sometimes referred to as beam steering).

The first wireless device 1002 may include one or more interface(s) 1014. The interface(s) 1014 may be used to provide input to or output from the first wireless device 1002. For example, a first wireless device 1002 that is a UE may include interface(s) 1014 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 1010/antenna(s) 1012 already described) that allow for communication between the UE and other devices and may operate according to known protocols (e.g., Wi-Fi®, Bluetooth®, and the like).

The first wireless device 1002 may include an encoding and decoding module 1016. The encoding and decoding module 1016 may be implemented via hardware, software, or combinations thereof. For example, the encoding and decoding module 1016 may be implemented as a processor, circuit, and/or instructions 1008 stored in the memory 1006 and executed by the processor(s) 1004. In some examples, the encoding and decoding module 1016 may be integrated within the processor(s) 1004 and/or the transceiver(s) 1010. For example, the encoding and decoding module 1016 may be implemented by a combination of software components (e.g., executed by a DSP or a general processor) and hardware components (e.g., logic gates and circuitry) within the processor(s) 1004 or the transceiver(s) 1010.

The encoding and decoding module 1016 may be used for various aspects of the present disclosure, for example, aspects of FIGS. 5-9. The encoding and decoding module 1016 is configured to encode or decode a MAC frame as described in relation to FIGS. 5-9.

The second wireless device 1018 may include one or more processor(s) 1020. The processor(s) 1020 may execute instructions such that various operations of the second wireless device 1018 are performed, as described herein. The processor(s) 1020 may include one or more baseband processors implemented using, for example, a CPU, a DSP, an ASIC, a controller, an FPGA device, another hardware device, a firmware device, or any combination thereof configured to perform the operations described herein.

The second wireless device 1018 may include a memory 1022. The memory 1022 may be a non-transitory computer-readable storage medium that stores instructions 1024 (which may include, for example, the instructions being executed by the processor(s) 1020). The instructions 1024 may also be referred to as program code or a computer program. The memory 1022 may also store data used by, and results computed by, the processor(s) 1020.

The second wireless device 1018 may include one or more transceiver(s) 1026 that may include RF transmitter and/or receiver circuitry that use the antenna(s) 1028 of the second wireless device 1018 to facilitate signaling (e.g., the signaling 1034) to and/or from the second wireless device 1018 with other devices (e.g., the first wireless device 1002) according to corresponding RATs.

The second wireless device 1018 may include one or more antenna(s) 1028 (e.g., one, two, four, or more). In embodiments having multiple antenna(s) 1028, the second wireless device 1018 may perform MIMO, digital beamforming, analog beamforming, beam steering, etc., as has been described.

The second wireless device 1018 may include one or more interface(s) 1030. The interface(s) 1030 may be used to provide input to or output from the second wireless device 1018. For example, a second wireless device 1018 that is a base station may include interface(s) 1030 made up of transmitters, receivers, and other circuitry (e.g., other than the transceiver(s) 1026/antenna(s) 1028 already described) that enables the base station to communicate with other equipment in a core network, and/or that enables the base station to communicate with external networks, computers, databases, and the like for purposes of operations, administration, and maintenance of the base station or other equipment operably connected thereto.

The second wireless device 1018 may include an encoding and decoding module 1032. The encoding and decoding module 1032 may be implemented via hardware, software, or combinations thereof. For example, the encoding and decoding module 1032 may be implemented as a processor, circuit, and/or instructions 1024 stored in the memory 1022 and executed by the processor(s) 1020. In some examples, the encoding and decoding module 1032 may be integrated within the processor(s) 1020 and/or the transceiver(s) 1026. For example, the encoding and decoding module 1032 may be implemented by a combination of software components (e.g., executed by a DSP or a general processor) and hardware components (e.g., logic gates and circuitry) within the processor(s) 1020 or the transceiver(s) 1026.

The encoding and decoding module 1032 may be used for various aspects of the present disclosure, for example, aspects of FIGS. 5-9. The encoding and decoding module 1032 is configured to encode or decode a MAC frame as described in relation to FIGS. 5-9.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a wireless device, the method comprising:
performing data bearer negotiation to initialize a connection-oriented mode using ultra-wideband (UWB);
encoding a Medium Access Control (MAC) frame, wherein the MAC frame includes a MAC header (MHR) and multiple data subframes, wherein the multiple data subframes each comprise a delimiter comprising a signature indicating a beginning of an associated data subframe, a Data Message Payload information element (IE) header, a link layer (LL) packet, and a frame check sequence (FCS); and
transmitting the MAC frame including the multiple data subframes to another device using the UWB in connection-oriented mode.

2. The method of claim 1, wherein each of the data subframes further comprises a duplicated MHR.

3. The method of claim 1, further comprising receiving a second MAC frame comprising an acknowledgment status indicating whether each of the LL packets were successfully received, wherein the acknowledgment status is included after a payload IE or in an independent data subframe.

4. The method of claim 1, further comprising encoding within the MAC frame an acknowledgment status included after a payload IE or in an independent data subframe.

5. The method of claim 4, wherein the independent data subframe comprises a duplicated MHR.

6. The method of claim 1, wherein the delimiter of each of the data subframes further comprises padding, a length indicator, and a Cyclic Redundancy Checksum (CRC).

7. The method of claim 1, wherein a signature of a final data subframe is altered to indicate the final data subframe.

12

8. A computing apparatus comprising:
a processor; and
a memory storing instructions that, when executed by the processor, configure the apparatus to:
perform data bearer negotiation to initialize a connection-oriented mode using ultra-wideband (UWB);
encode a Medium Access Control (MAC) frame, wherein the MAC frame includes a MAC header (MHR) and multiple data subframes, wherein the multiple data subframes each comprise a delimiter comprising a signature indicating a beginning of an associated data subframe, a Data Message Payload information element (IE) header, a link layer (LL) packet, and a frame check sequence (FCS); and
transmit the MAC frame including the multiple data subframes to another device using the UWB in connection-oriented mode.

9. The computing apparatus of claim 8, wherein each of the data subframes further comprises a duplicated MHR.

10. The computing apparatus of claim 8, wherein the instructions further configure the apparatus to receive a second MAC frame comprising an acknowledgment status indicating whether each of the LL packets were successfully received, wherein the acknowledgment status is included after a payload IE or in an independent data subframe.

11. The computing apparatus of claim 8, wherein the instructions further configure the apparatus to encode within the MAC frame an acknowledgment status included after a payload IE or in an independent data subframe.

12. The computing apparatus of claim 11, wherein the independent data subframe comprises a duplicated MHR.

13. The computing apparatus of claim 8, wherein the delimiter of each of the data subframes further comprises padding, a length indicator, and a Cyclic Redundancy Checksum (CRC).

14. The computing apparatus of claim 8, wherein a signature of a final data subframe is altered to indicate the final data subframe.

15. A non-transitory computer-readable storage medium, the computer-readable storage medium including instructions that when executed by a computer, cause the computer to:
perform data bearer negotiation to initialize a connection-oriented mode using ultra-wideband (UWB);
encode a Medium Access Control (MAC) frame, wherein the MAC frame includes a MAC header (MHR) and multiple data subframes, wherein the multiple data subframes each comprise a delimiter comprising a signature indicating a beginning of an associated data subframe, a Data Message Payload information element (IE) header, a link layer (LL) packet, and a frame check sequence (FCS); and
transmit the MAC frame including the multiple data subframes to another device using the UWB in connection-oriented mode.

16. The computer-readable storage medium of claim 15, wherein each of the data subframes further comprises a duplicated MHR.

17. The computer-readable storage medium of claim 15, wherein the instructions further configure the computer to receive a second MAC frame comprising an acknowledgment status indicating whether each of the LL packets were successfully received, wherein the acknowledgment status is included after a payload IE or in an independent data subframe.

18. The computer-readable storage medium of claim 15, wherein the instructions further configure the computer to encode within the MAC frame an acknowledgment status included after a payload IE or in an independent data subframe.

19. The computer-readable storage medium of claim 18, wherein the independent data subframe comprises a duplicated MHR.

20. The computer-readable storage medium of claim 15, wherein the delimiter of each of the data subframes further comprises padding, a length indicator, and a Cyclic Redundancy Checksum (CRC), wherein a signature of a final data subframe is altered to indicate the final data subframe.

* * * * *